UNITED STATES PATENT OFFICE.

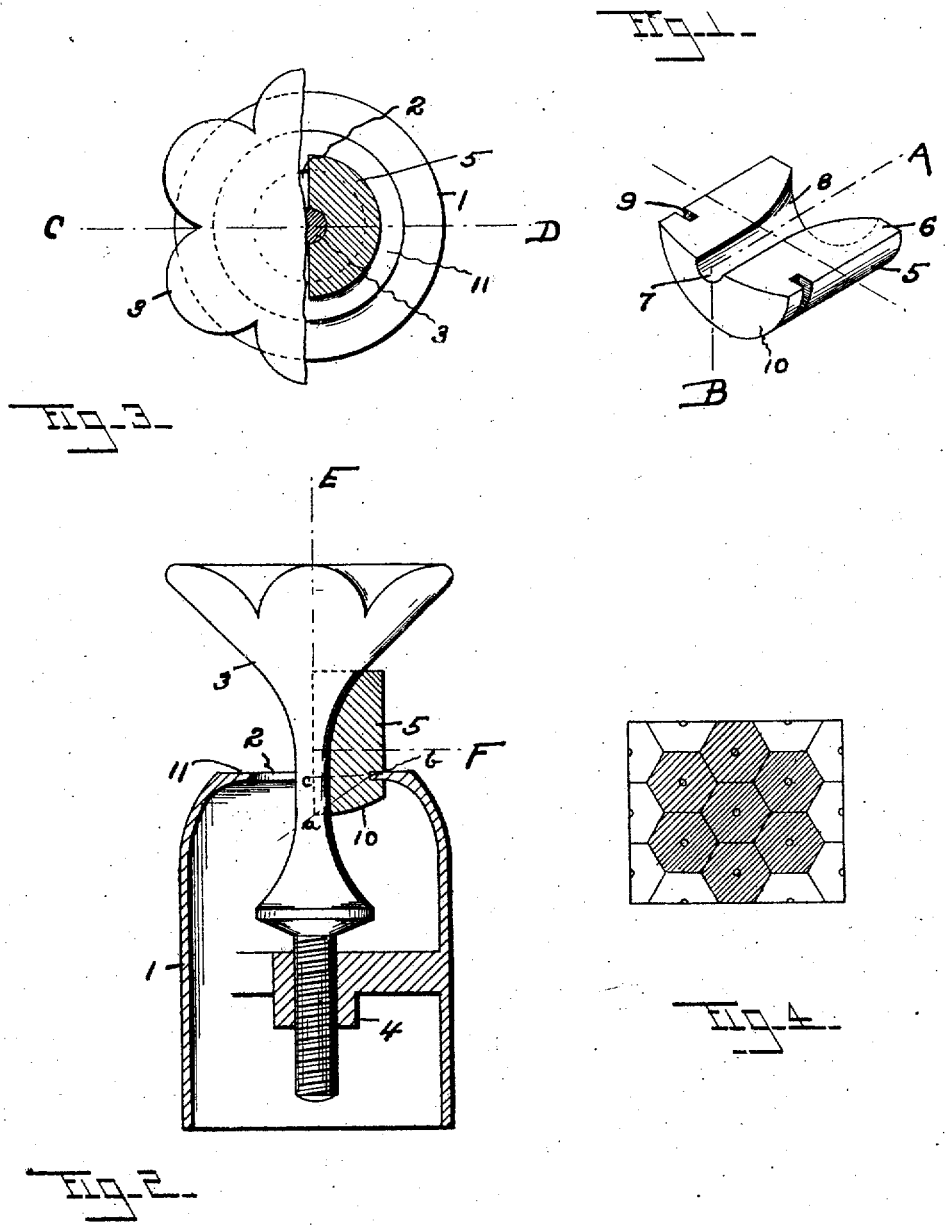

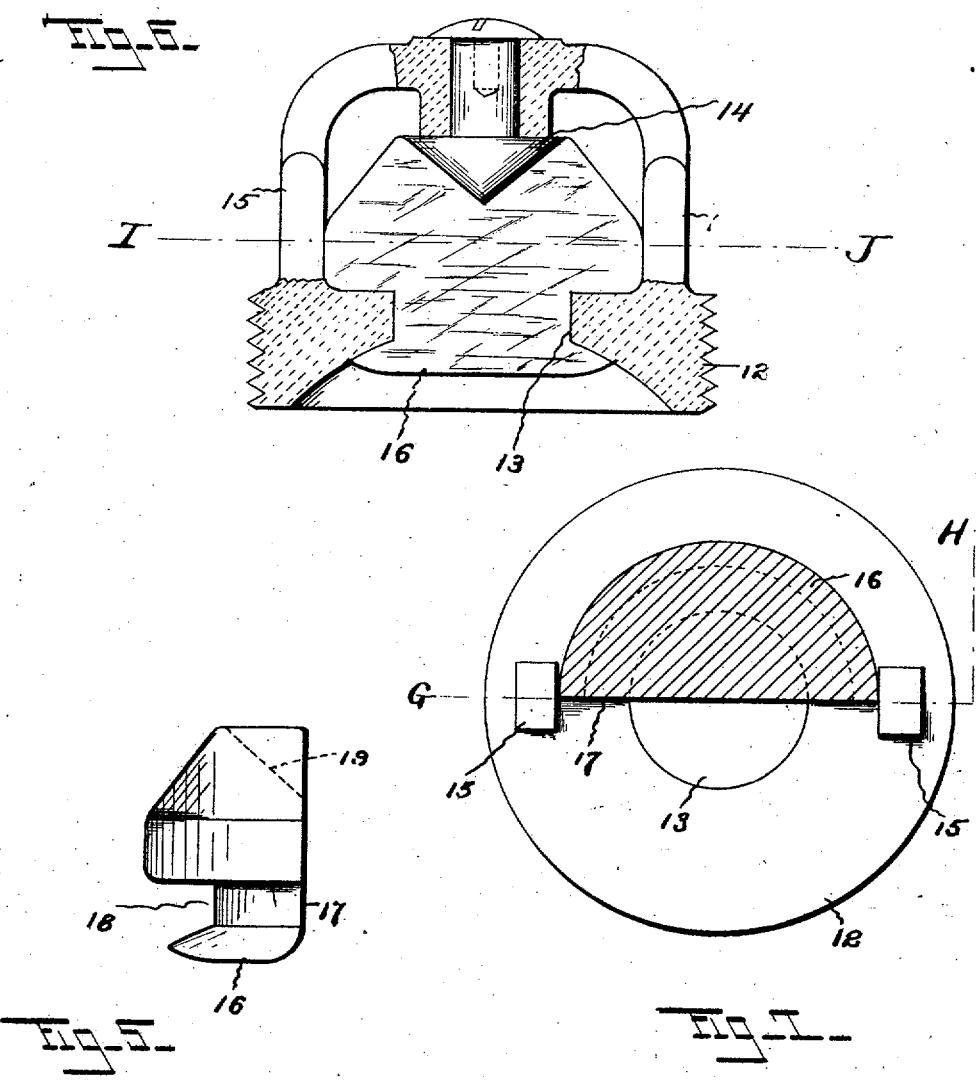

WILLIAM GAVIN TAYLOR, OF MONTCLAIR, NEW JERSEY.

FRACTIONAL-SPRAY PLUG.

968,095.   Specification of Letters Patent.   Patented Aug. 23, 1910.

Application filed January 10, 1910. Serial No. 537,254.

*To all whom it may concern:*

Be it known that I, WILLIAM GAVIN TAYLOR, a citizen of the United States, residing at Montclair, in the county of Essex and State of New Jersey, have invented certain new and useful Improvements in Fractional-Spray Plugs, of which the following is a specification, reference being had therein to the accompanying drawings.

My invention relates to new and useful improvements in fractional spray plugs, having for its object, among other things, to provide a device of simple and economical structure that may be readily attached to a spraying nozzle and limit the diffusion of matter therefrom to a fractional part of the entire diffusional area.

To these, and other ends, my invention consists in the fractional spray plug hereinafter described, and more particularly pointed out in the claims.

Referring to the drawings, in which like numerals of reference designate like parts in the several figures; Figure 1 is an isometric drawing of my improved device; Fig. 2 is a sectional view thereof upon line A—B of Fig. 1, with the spreader and nozzle dome (section upon line C—D of Fig. 3) in their proper relative positions; Fig. 3 is a sectional plan view of the parts shown in Fig. 2 upon line E—F; Fig. 4 is a plan of a filter bed, wherein each of the nozzles in the battery distributes matter over a hexagonal area, with said nozzles so arranged that the perimeter of each hexagonal area will contact with the perimeter of the hexagonal area next adjacent; Fig. 5 is a side elevation of a modified form of my invention especially designed for use with a nozzle, wherein the spreader is suspended above the discharge orifice by one or more arms; Fig. 6 is a front elevation thereof, with a sectional view of the nozzle, to which it is attached, taken upon line G—H of Fig. 7; and Fig. 7 is a sectional plan view of the parts shown in Fig. 6 upon line I—J.

Under the present practice, with the most advantageous arrangement of nozzles upon a filter bed, the percentage of unwetted area is considerable. This is due to the fact that the nozzle distributes the matter equally around its axis and cannot therefore be used where its center is nearer the edge of the filter bed than the radius of the area wetted by the nozzle. A filter bed wetted by the described arrangement of nozzles is illustrated in Fig. 4, wherein the matter diffused from each nozzle is distributed over a hexagonal area and that portion only of the total area of the filter bed, section lined, is wetted. The percentage of unwetted surface varies, of course, with the shape of the figure covered by each nozzle, the maximum unwetted surface arising where the nozzle distributes the matter over a circular area.

To utilize this unused area by the distribution of matter thereon is the primary object of my invention, which object is accomplished by the use of a plug, inserted within the orifice of the nozzle dome, upon the side adjacent to the edge of the bed, so that the matter passing through the orifice contacts with, and is only diffused from, that portion of the spreader toward the inside of said bed. The nozzle and its constituent parts used to accomplish this result are the same as the other nozzles used upon the filter bed, the closure plug being the only additional member.

There are two general types of distributing nozzles, one having its spreader, or diffusion cone, supported by a spindle which passes down through the discharge orifice, illustrated in Figs. 2 and 3, and the other with its spreader, or diffusion cone, supported by one or more exterior arms, as illustrated in Figs. 6 and 7. My invention is adapted for use with either of these types.

Referring now to Figs. 2 and 3, the numeral 1 designates the dome having an orifice 2 in one end and within which the spreader 3 is threaded through the arm 4. The spreader 3 is designed to distribute matter over the area of a hexagonal figure, but my improved plug may be used equally as well with any spreader, irrespective of the shape of the geometrical figure, over which matter is diffused therefrom.

My improved fractional spray plug, for use with the type of nozzle shown in Figs. 2 and 3, is designated by the numeral 5, and is preferably made of rubber, or other resilient material, and has a flat face 6, within which is a semicircular groove 7 that terminates at one end in a flaring throat 8, said groove and throat being of substantially the same diameter and shape as the stem of the spreader 3. Around the outside of the plug, and near one end is an annular groove 9 of substantially the same width as the thickness of the dome head 11, and the end 10 of the plug adjacent thereto is convexed so that the distance between the points *a—b* is greater than that between the points *c—d*. In operation the plug is within the orifice 2, with the groove 7 and throat 8 in contact with the spreader 3, and that portion of the dome head 11 adjacent to the edge of said orifice projecting into the groove 9. In this position one-half of the orifice opening is closed and the plug is securely held against displacement by pressure from within by reason of the convex bottom and the engagement of the groove with the dome head. It is apparent that as the matter passes through the dome it only contacts with one side of the spreader and therefore is only diffused over a fractional portion of the geometrical area that would be covered by said spreader but for the closure plug.

Referring to Figs. 5, 6 and 7, the numeral 12 designates the dome; 13 the discharge orifice; 14 the spreader; 15 the arms from which the spreader is suspended with its axis coincident with the axis of said orifice; and 16 the plug which is constructed with a flat face 17, an annular groove 18 near one end, and an open throat 19 into which the spreader 14 projects when the plug is inserted within the dome 13, as shown in Figs. 6 and 7, wherein its operation and function is the same as that of the plug 5, above described.

In the drawings the plug is shown as closing substantially one-half of the area of the orifice opening, but it may be made to cover a greater or less area as desired.

Having described my invention, what I claim as new and desire to secure by Letters Patent, is,—

1. The combination with a discharge nozzle having an orifice opening therein; of a spreader passing through said orifice and designed to direct the discharge of the matter passing from said nozzle over the area of a regular geometrical figure; and a removable plug, held within said orifice and against said spreader, whereby the discharge area of said orifice is lessened and the matter therefrom discharged over only a fractional portion of said geometrical figure.

2. The combination with a discharge nozzle having an orifice opening therethrough; of a plug of suitable form and material held within said nozzle by the engagement of a part thereof with said plug, which plug causes a fractional flow from said orifice, said fractional flow being upon one side of the center of said orifice.

3. A fractional spray plug having one convex end, a face within which is a groove that terminates in an outwardly flaring throat, and an annular groove in the outside of said plug, substantially concentric with said first groove.

4. A fractional spray plug, having a face within which is a groove that terminates in an outwardly flaring throat, and an annular groove in the outside of said plug substantially concentric with said first groove.

In testimony whereof I affix my signature in presence of two witnesses.

WILLIAM GAVIN TAYLOR.

Witnesses:
J. MADDEN,
Jos. PITTINGER.